J. AND H. TRUST.
FOOD MACHINE.
APPLICATION FILED SEPT. 18, 1919.
1,418,107.
Patented May 30, 1922.
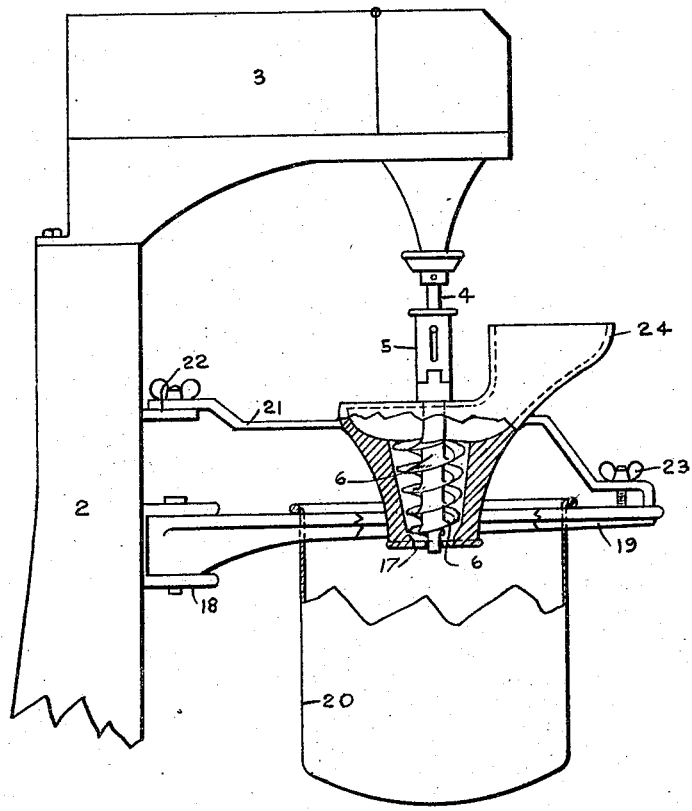
INVENTORS
Josephine Trust
Henry Trust
BY
ATTORNEY

UNITED STATES PATENT OFFICE.

JOSEPHINE TRUST AND HENRY TRUST, OF PARK RIDGE, NEW JERSEY, ASSIGNORS, BY MESNE ASSIGNMENTS, TO METEOR MIXING MACHINE CO., INC., A CORPORATION OF NEW YORK.

FOOD MACHINE.

1,418,107.           Specification of Letters Patent.     Patented May 30, 1922.

Application filed September 18, 1919. Serial No. 324,604.

*To all whom it may concern:*

Be it known that we, JOSEPHINE TRUST and HENRY TRUST, citizens of the United States, residing at Park Ridge, in the county of Bergen and State of New Jersey, have invented certain new and useful Improvements in Food Machines, of which the following is a specification, reference being had therein to the accompanying drawing.

Our invention relates to improvements in food machines and more particularly has reference to a type of machine adapted as a meat chopper and for other purposes. The meat chopper features of the machine are a design in the form of attachments adapted for use upon a standard type of machine which may be used for other purposes such as mixing, beating, mashing, and straining.

Referring to the accompanying drawing, we have illustrated in side elevation parts being broken away and partly in cross section, a suitable type of machine embodying an application of our invention. 2 indicates the standard of the machine provided at the top with a suitable transmission box 3 from which power is transmitted to the spindle 4 provided with a chuck 5 within which is secured the tool 6 which in this case is in the form of a worm adapted to feed meat and similar material against the cutters at 17.

18 indicates a suitable bracket for carrying the pail support 19 within which is held the pail 20 and 21 indicates another bracket detachably secured at 22 to the machine as shown, the outer end of said bracket 21 being adapted to be secured to the pail support 19 by any suitable means such as the wing nut 23. 24 indicates the hopper into which the meat or other food to be treated is introduced and this is preferably secured by any suitable means to the bracket 21 or may be cast therewith, thus allowing the feed worm 6 to rotate therein and feed the meat against the cutters at 17 at which point it is dropped into the pail and from which it may be removed.

Of course, it will be understood that various modifications may be made in the construction and arrangement of parts without departing from the spirit of the invention as claimed.

We claim:

In a machine of the class described, power and transmission mechanism at the top thereof, and a tool spindle depending therefrom, a food machine beneath said spindle having a worm feed in axial alignment with said spindle, and a hopper at one side of said spindle for feeding said food machine, and in combination therewith a removable pail beneath said food machine, and brackets extending from said mechanism for retaining said food machine and pail in position.

In testimony whereof we hereunto affix our signatures in the presence of two witnesses.

JOSEPHINE TRUST.
HENRY TRUST.

Witnesses:
MADELINE C. FOERST,
DAVID H. DOUGLAS.